N. W. DENDY.
BED WARMING DEVICE.
APPLICATION FILED OCT. 4, 1919.
1,347,995.
Patented July 27, 1920.
2 SHEETS—SHEET 2.
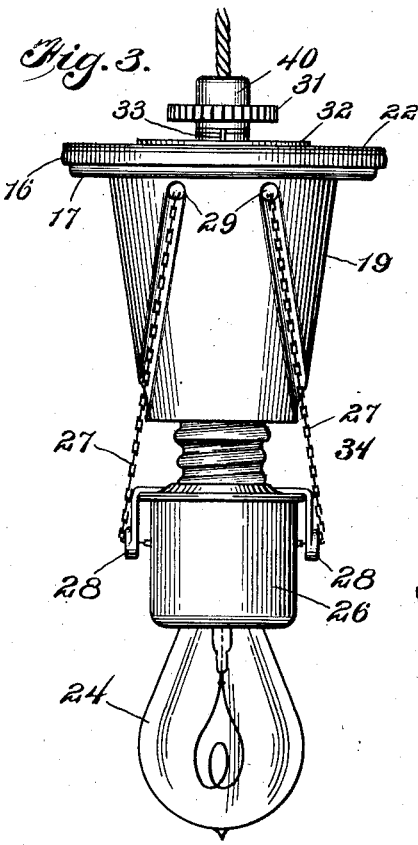
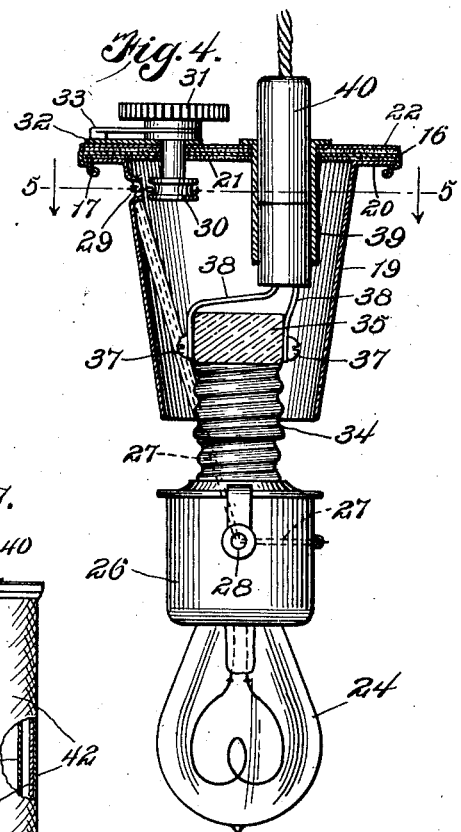
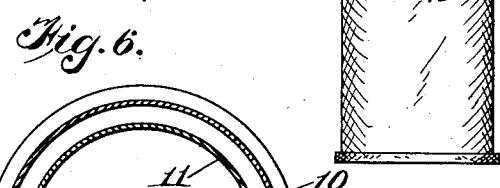
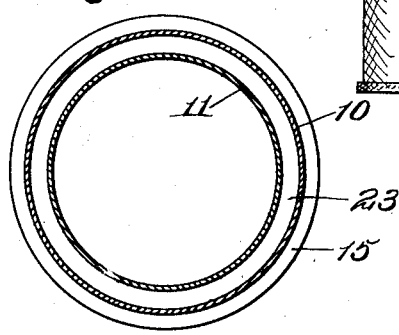
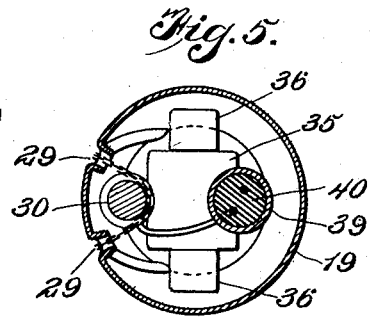
Witnesses
L. R. Heinrichs
Inventor
N. W. Dendy
By Victor J. Evans
Attorney

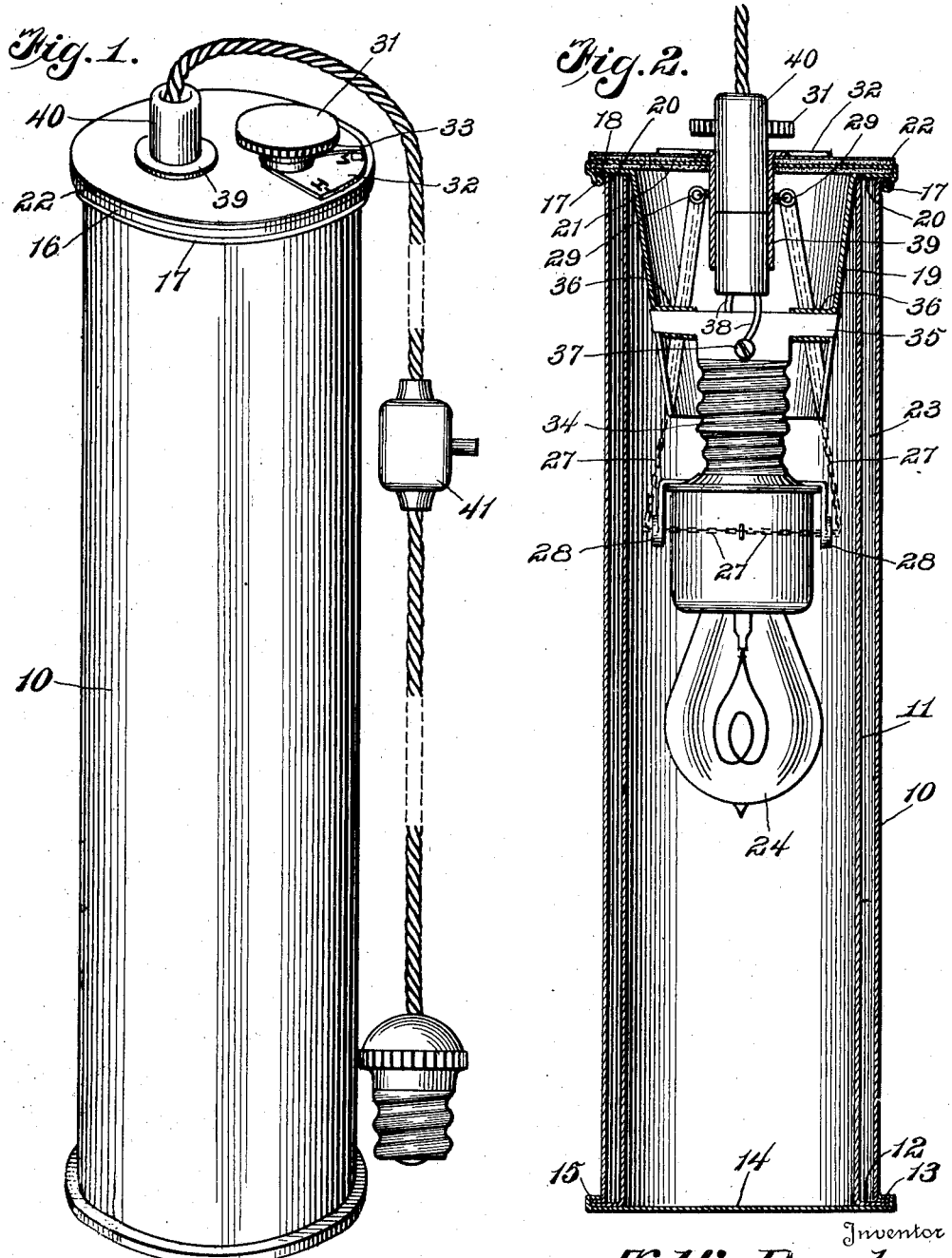

UNITED STATES PATENT OFFICE.

NATHANIEL WALKER DENDY, OF ASHEVILLE, NORTH CAROLINA.

BED-WARMING DEVICE.

1,347,995.  Specification of Letters Patent.  Patented July 27, 1920.

Application filed October 4, 1919. Serial No. 328,428.

*To all whom it may concern:*

Be it known that I, NATHANIEL W. DENDY, a citizen of the United States, residing at Asheville, in the county of Buncombe and State of North Carolina, have invented new and useful Improvements in Bed-Warming Devices, of which the following is a specification.

This invention relates to improvements in electric bed warming devices especially adapted for heating beds and for the use of heating or "ironing" patients for the relief of backache, or other ills.

Another object of the invention is the provision of a bed warming device, in which the degree of heat may be easily and quickly regulated to suit the convenience of the user.

Another object is the provision of a bed warming device, in which the heating element may be easily and quickly removed or replaced, or for the purpose of changing the degree of heat units of the said heating element.

A further object is the provision of a bed warming device in which the heat is evenly distributed throughout the entire outer surface thereof and in which the heat will be retained for an appreciable period after the supply of current has been cut off.

A still further object of the invention is the provision of a bed warming device having a novel form of casing which will permit of its use for "rolling or ironing" the muscles of the patient for the relief of pain, the construction further providing a novel form of closure for one end of the pad, which serves in addition to support the heating element and to properly space one end of the inner and outer cylindrical member of the pad apart to maintain them in proper position for the formation of an air chamber.

Other objects and advantages of the invention will appear as the following description is read in connection with the accompanying drawings.

In the drawings:

Figure 1 is a perspective view of a bed warming device embodying the present invention.

Fig. 2 is a central longitudinal sectional view of the same, showing the heating element in elevation.

Fig. 3 is an elevation of the heating element and its support removed from the casing.

Fig. 4 is a longitudinal sectional view of the same.

Fig. 5 is a horizontal section on the line 5—5 of Fig. 4.

Fig. 6 is a transverse sectional view through the bed warming device.

Fig. 7 is an elevation of the bed warming device showing the same inclosed in a casing or cover.

Referring to the drawings in detail, wherein like characters of reference denote corresponding parts, the invention comprises a preferably cylindrical device, which includes an outer casing 10 and an inner casing 11. The last mentioned casing is arranged concentrically within the outer casing and is provided at one end with an outwardly and laterally extending flange 12, which is adapted to rest beneath a flange 13, formed on the outer casing 10. This last mentioned flange is relatively narrow, and the inner and outer casings are held in proper spaced relation at this end through the medium of a closure 14. This is accomplished by providing the said closure with an inwardly turned bead 15, which engages over the flange 13 and holds the flange 12 of the inner casing 11 in proper relative position.

The opposite ends of both the inner and outer casings are open and are adapted to be closed by a removable closure 16, which is also formed with an inwardly extending bead 17, for engagement with a flange 18, formed on the end of the outer casing 10. The bead 17 is so formed as to permit of its being sprung into and out of engagement with the flange 18, so that the closure 16 will be removably held in position.

Carried by the closure 16 and extending within the inner casing 11, is a hollow tapered member 19. This member 19 is provided with a laterally extending flange 20, which is engaged beneath the bead 17 of the removable closure, and positioned between this closure and the flange 20 is a lining of asbestos, or other heat resisting material 21. The outer surface of the closure 16 is also preferably covered with a layer of asbestos upon which is secured a covering of suitable fabric, as indicated at 22. This serves to protect the removable closure 16 from the heat, so as to permit of its removal without inconvenience to the user.

In positioning the closure 16, the member 19 is inserted within the inner casing 11, in a manner to engage and position the adjacent end of the casing and hold it in proper spaced relation with respect to the outer casing 10, so that an air chamber 23 is formed, which entirely surrounds the said inner casing. In addition, the member 19 serves as a support for the heating element, which is herein shown as an incandescent lamp 24, the socket 25 of which is provided with means for regulating the strength or candle power of the light, thus providing means for regulating the degree of heat supplied within the inner casing. This regulating means may be of any well known form, such as is usually employed in lamps of this character; the means shown including a rotatable sleeve 26, which is operated by means of a chain, or other flexible member 27. The member 27 passes through guide eyes 28 positioned upon each side of the sleeve 26 and downward through openings 29 provided in the tapered member 19. Positioned within the member 19 is a spool or other rotatable member 30, which is connected to a disk 31, located upon the outside of the closure 16, so that when the said disk is rotated the chain or flexible member 27 will be operated to rotate the sleeve 26 and regulate the lamp 24.

Positioned upon the outside of the casing 16 is a dial 32, which is provided with indicia to indicate the degree or amount of heat supplied by the lamp 24; for example, L indicates a low heat, M a medium heat and H high heat. A pointer 33 is carried by the disk 31 and coöperates with the dial 32. The lamp 24 is removably mounted within a socket 34, which is mounted upon a base 35, preferably formed of porcelain, or other suitable insulation. This base is held between ears 36, which may be struck from or secured to the member 19. The conductors 38, which are connected to the lamp socket 34, are connected to suitable terminals 37, which extend within a socket 39 carried by the closure 16. These terminals engage a plug 40, which is removably positioned within the socket, so that the lamp may be connected by means of a cord to a suitable source of current. It is preferred to include a switch 41, which is carried by and connected to the cord, so that the latter may be conveniently secured in position when the heater is used for the purpose of warming a bed.

By the use of a lamp of the character shown as a heating element, the same may be readily replaced when desired at a small cost. It is also possible to replace the lamp with one of a different wattage or candle power, so that the maximum heating strength of the bed warming device may be increased or reduced, as desired; for example, when the bed warming device is used for the purpose of warming a bed, a lamp of sufficient candle power may be employed, which will not generate enough heat to endanger the bed clothing should the heater for any reason be left burning for an indefinite period, while a lamp of increased power may be substituted, if desired, when it is desired to use the heater for heating or ironing the muscles of the body.

It will be thus seen that the invention provides a bed warming device in which the degree of heat may be regulated, as desired, and which is comparatively inexpensive of operation and upkeep, while its structure serves to evenly distribute the heat over the entire surface of the casing.

If desired the bed warming device may be incased within a cover or casing 42, which may be made of cloth or other suitable fabric, so that the flesh of the user will not contact with the metallic surface.

The invention is susceptible to various changes in its form, proportions and minor details of construction and the right is herein reserved to make such changes as properly fall within the scope of the appended claims.

Having described the invention, what is claimed is:

1. An electric bed warmer comprising a double walled casing having a removable closure at one end thereof, a non-metallic fabric surrounding the casing, a heating element arranged within the inner wall of the double walled casing and closing the other end thereof, and means located upon the outside of the casing and connected to the heating element for regulating the heat.

2. An electric bed warmer comprising a double walled casing having a removable closure at both ends, a non-metallic fabric surrounding the casing, a heating element positioned within the inner casing, an inwardly extending tapered member carried by one closure and constituting a support for the heating element and engaging the adjacent end of the inner wall of the casing to center the same, and means located exteriorly of one closure for regulating the electrical energy to the heating element.

In testimony whereof I affix my signature.

NATHANIEL WALKER DENDY.